United States Patent [19]
Chenausky et al.

[11] 4,174,504
[45] Nov. 13, 1979

[54] APPARATUS AND METHOD FOR CAVITY DUMPING A Q-SWITCHED LASER

[75] Inventors: Peter P. Chenausky, Avon; Carl J. Buczek, Manchester; Robert J. Wayne, Glastonbury, all of Conn.

[73] Assignee: United Technologies Corporation, Hartford, Conn.

[21] Appl. No.: 872,282

[22] Filed: Jan. 25, 1978

[51] Int. Cl.² .............................................. H01S 3/11
[52] U.S. Cl. ............................................... 331/94.5 Q
[58] Field of Search .................... 331/94.5 C, 94.5 M, 331/94.5 ML, 94.5 Q

[56] References Cited
U.S. PATENT DOCUMENTS

| 3,500,241 | 3/1970 | Bjorkholm | 331/94.5 Q |
| 3,609,586 | 9/1971 | Danielmeyer | 331/94.5 Q |
| 3,764,937 | 10/1973 | Skolnick | 331/94.5 Q |

OTHER PUBLICATIONS

Shimizu, Q–Switching of $N_2O$ and $CO_2$ Lasers by Stark Effect of Ammonia, Appl. Phys. Lett., vol. 16, (May 1970), pp. 368–370.
Hall et al., High–Efficiency Driven Q Switching of the $CO_2$ Laser Using the Stark Effect in Molecular Gases, IEEE J. Quant. Electr., vol. QE–7, (Aug. 1971), pp. 427–429.

Primary Examiner—William L. Sikes

Attorney, Agent, or Firm—Lawrence A. Cavanaugh

[57] ABSTRACT

A laser having a gaseous gain medium capable of continuous wave operation and including an etalon with a Stark active gas disposed therein, adapted for providing submicrosecond pulses is disclosed. A method of utilizing the Stark effect to tune rapidly an etalon to form an output mirror having a variable reflectivity to Q-switch and cavity dump the optical flux within a laser to provide an output pulse of laser radiation having a submicrosecond pulse width, typically variable between fifty and three hundred fifty nanoseconds, at a pulse repetition frequency up to twenty-five kilohertz is disclosed. A laser typically having a carbon dioxide gain medium adapted for continuous wave operation includes a grating defining one end of the laser resonator and an output mirror defining the other end wherein the output mirror is an etalon formed with two mirrors containing a switching cell having a Stark active gas disposed therein. A voltage applied to the switching cell rapidly transforms the highly transmissive state of the output mirror to a highly reflective state to Q-switch the laser. Terminating the voltage rapidly transforms the highly reflective state of the output mirror to its original highly transmissive state to cavity dump the Q-switched optical pulse. Controlling the width, fall time and repetition rate of the voltage pulse controls the pulse intensity, pulse width and pulse repetition frequency of the laser output pulses.

27 Claims, 4 Drawing Figures

REFLECTIVITY OF ETALON

REFLECTIVITY OF OUTPUT MIRROR

APPARATUS AND METHOD FOR CAVITY DUMPING A Q-SWITCHED LASER

The invention herein described was made in the course of or under a contract or subcontract thereunder, with the Department of the Army.

BACKGROUND OF THE INVENTION

This invention relates to lasers and more particularly to an apparatus and method for cavity dumping Q-switched radiation from a molecular laser to obtain pulses having submicrosecond duration with a high pulse repetition frequency.

The generation of pulses from a carbon dioxide laser having durations in the range between a few nanoseconds to three hundred fifty nanoseconds, suitable for laser radar or communication type applications, is highly desirable. Pulses having this duration are difficult to achieve in part from the recognized difficulty of modulating carbon dioxide lasers in general and the fact that this range of pulse duration lies between two common techniques for modulating carbon dioxide lasers, mode locking and intracavity Q-switching. The pulse duration of interest lies in the intermediate range where neither mode locking nor intracavity Q-switching will generate pulses which are of the desired duration. Mode locking techniques produce pulses of a few nanoseconds duration which are too short for many radar scenarios and have only a fixed pulse repetition frequency which may be unsuitable for many communication applications. Intracavity Q-switching techniques, either by a saturable absorber or by electro-optical modulators, have difficulty producing pulses of less than three hundred fifty nanoseconds at the full width half maximum point due to the dynamics of the upper energy level in the gain medium. A copending application entitled "Method for Cavity Dumping a Q-Switched Laser" Ser. No. 872,274 filed on even date herewith and held with the present application by a common assignee, discloses a method for the generation of short infrared pulses with adjustable pulse widths in the ten to three hundred nanosecond range utilizing an intracavity electro-optic modulator.

For applications requiring pulses of laser radiation having moderate power and high pulse repetition frequencies, passively Q-switched saturable absorbers have been employed with carbon dioxide lasers. Skolnick et al in U.S. Pat. No. 3,764,937 filed Apr. 26, 1972 and held with the present application by a common assignee discloses a $SF_6$ saturable absorber to passively Q-switch a carbon dioxide laser having intracavity dispersive elements to prevent laser oscillations at lines for which the $SF_6$ has a low or zero loss and to select the operating wavelength of the laser. In addition the cavity length is controlled to stabilize the output to a given pulse repetition frequency. For this configuration the intrapulse period is a function of the recovery time of the inversion of the carbon dioxide gain medium while the pulse tail is a function of the recovery time of the saturable absorber. A long pulse tail is undesirable for pulsed laser radar applications.

The generation of high peak power, temporally short (tens of nanoseconds) pulses from a carbon dioxide laser cannot be easily achieved by passive Q-switching. Additionally, with passive Q-switching, the pulse repetition frequency is determined by the resonator, gain medium and the saturable absorber medium dynamics. Active modulation offers the alternative of obtaining electronically controlled pulse widths and pulse repetition frequencies. Active intracavity modulation and Q-switching of a carbon dioxide laser can be accomplished in very short times at high rates with gaseous and solid crystalline modulators. However, fast switching to remove a high loss from the laser is not by itself sufficient to efficiently generate short, high peak power pulses. Rather a technique to cavity dump quickly the high circulating flux within a Q-switched laser is required.

SUMMARY OF THE INVENTION

An object of the present invention is to provide pulses of infrared radiation having submicrosecond pulse widths.

According to the present invention a laser having an optical axis and adapted for providing submicrosecond pulses of infrared radiation at a high pulse repetition frequency comprises a first cavity adapted for accommodating a gaseous gain medium capable of continuous wave operation defined at one end by a first reflector and at the other end by a second reflector, a second cavity defined at one end by the second reflector and at the other end by a third reflector wherein the first cavity and the second cavity are symmetrically disposed about the optical axis in optical line of sight communication with each other, a switching cell symmetrically disposed about the optical axis within the second cavity, means for applying an electric potential across the switching cell in a direction transverse to the optical axis, means for tuning the first cavity to obtain maximum optical flux of a specific wavelength of radiation oscillating within the first cavity, and means for varying the separation between the second reflector and the third reflector to tune the second cavity to the frequency of radiation capable of oscillating within the first cavity.

In accordance further with the present invention a method of Q-switching and cavity dumping a continuous wave laser to provide pulses having submicrosecond pulse widths comprises providing a laser having a first cavity including a gaseous gain medium adapted for continuous wave operation and a second cavity defined at one end by a second reflector and at the other end by a third reflector wherein the second and third reflectors form a Fabry-Perot etalon, providing a switching cell within the second cavity adapted for Q-switching and cavity dumping radiation within the first cavity, generating a continuous discharge within the gain medium, controlling the wavelength of radiation capable of oscillating within the first cavity with a means for adjusting a first reflector defining one end of the first cavity to obtain resonance with a gas within the switching cell capable of exhibiting a Stark effect; controlling the separation between a second reflector defining one end of the etalon and a third reflector defining the other end of the etalon to obtain resonance of the etalon with the wavelength of radiation capable of oscillating within the first cavity; maintaining a gas capable of exhibiting a Stark effect within the switching cell such that the gas and the reflectors defining the etalon cooperate to provide an output mirror capable of transmitting the radiation from the first cavity, applying a voltage across the switching cell to produce a Stark effect within the gas to provide an output mirror having a high reflectivity to Q-switch the first cavity; maintaining the voltage across the switching cell until a desired optical flux within the first cavity is attained; and terminating the voltage to cavity dump the optical power within the first cavity resulting in a pulse of radiation having a submicrosecond pulse width.

A feature of the present invention is the switching cell located within the second cavity adapted for accommodating a gas capable of exhibiting a Stark effect. A mixture of $NH_3$ and $ND_3$ gas inserted into the switching cell yields a gas mixture containing at least some $NH_2D$ which is capable of exhibiting a large Stark effect. Additionally the second and third reflectors cooperate with the switching cell to form a Fabry-Perot etalon wherein the first cavity and the Fabry-Perot etalon cooperate to form a coupled resonator geometry of the laser. The Fabry-Perot etalon is tuned to the frequency of radiation oscillating within the first cavity and cooperates with the switching cell to form the output mirror of the laser. A grating forming the first reflector is adjusted to select the oscillating wavelength within the first cavity. A first piezoelectric transducer positioned on the grating is capable of tuning the first cavity to obtain maximum optical power at the wavelength oscillating within the first cavity. A second piezoelectric transducer positioned on the third reflector defining one end of the second cavity is adapted for controlling the separation between the second and third reflectors to obtain minimum reflectivity of the output mirror at the frequency of the radiation capable of oscillating within the first cavity. A preferred gain medium includes carbon dioxide gas. In the preferred embodiment the separation of the reflectors forming the etalon is adjusted to produce an output mirror highly transmissive at the frequency of the radiation when the switching cell is unactivated. A voltage applied across the switching cell activates the cell to produce a Stark effect within the gas which frequency tunes the output mirror to a high reflectivity state allowing Q-switch buildup of the optical flux within the first cavity. The termination of the voltage returns the output mirror to a highly transmitting state allowing the Q-switched optical flux within the first cavity to be cavity dumped to provide a laser pulse having a submicrosecond pulse width. Applying a voltage pulse across the switching cell at a high pulse repetition rate produces submicrosecond laser pulses at a high pulse repetition frequency. Optical pulses are obtainable having pulse widths variable from fifty nanoseconds to three hundred fifty nonoseconds with peak optical powers of up to at least two hundred watts and pulse repetition frequencies variable up to at least twenty-five kilohertz.

An advantage of the present invention is the ability to produce submicrosecond pulses having a variable shape and duration useful in carbon dioxide laser radar systems. Additionally a direct current voltage bias on the switching cell to place the switching gas in an absorbing state is not required as with conventional Q modulators thereby minimizing gas breakdown difficulties within the low pressure switching cell. Additionally this switching configuration can be used either in a cavity dump mode or in a noncavity dump mode. Also since the high reflectivity state of the etalon accomplishes the Q-switch buildup of the optical power within the first cavity while the low reflectivity state of the etalon accomplishes cavity dumping of the optical power, saturation effects which could influence the pulse length are minimized.

The foregoing and other objects, features and advantages of the present invention will become more apparent in the light of the following detailed description of the preferred embodiment thereof as illustrated in the accompanying drawing.

DETAILED DESCRIPTION OF THE PREFERRED EMBODIMENT

Figure 1:
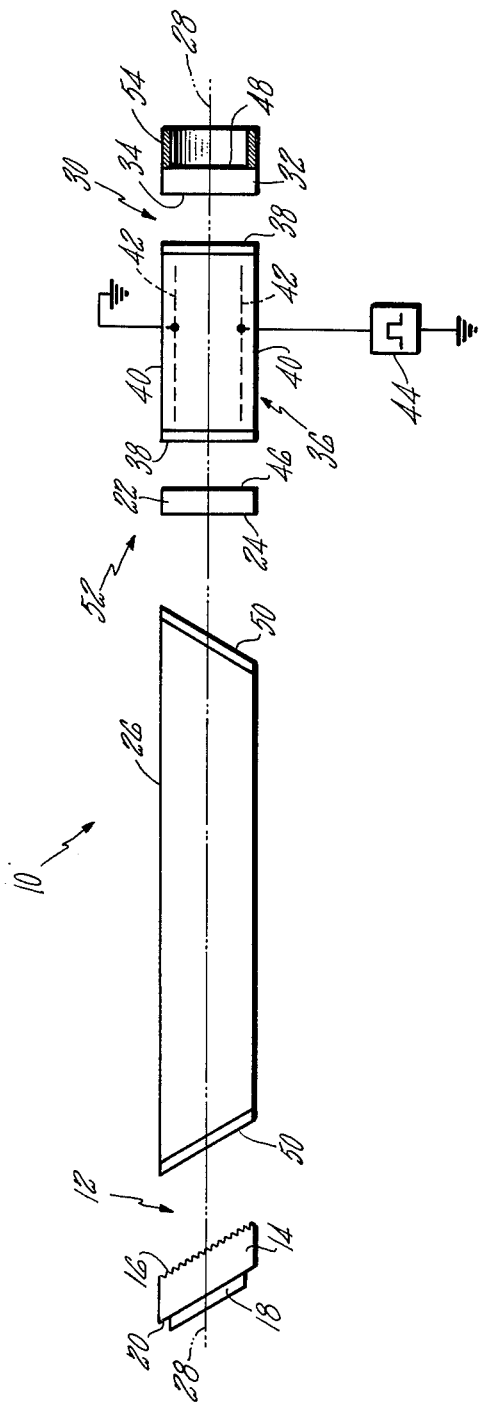
FIG. 1 is a simplified schematic diagram of the major components of the present invention.

The present invention is an apparatus and method for providing fast switching of a carbon dioxide laser by utilizing an intracavity switching cell with a Stark active gas having absorption lines nearly coincident to the desired wavelength of the radiation from a carbon dioxide gain medium. FIG. 1 shows a schematic diagram of a laser 10 capable of providing pulses with a submicrosecond duration at a high pulse repetition frequency. The laser 10 has a first cavity 12 defined at one end by a first reflector 14 having a reflective surface 16 in the form of a grating and a piezoelectric transducer 18 attached to the back surface 20 of the first reflector and defined at the other end by a second reflector 22 having a second reflective surface 24, a gain tube 26 disposed within the first cavity 12 symmetrically about an optical axis 28, a second cavity 30 defined at one end by the second reflector 22 and at the other end by a third reflector 32 having a third reflective coating 34 disposed thereon. A switching cell 36, positioned within the second cavity symmetrically about the optical axis 28, has transmission windows 38 located at each end of the cell walls 40. Electrodes 42 positioned juxtaposed the cell walls within the switching cell are adapted for applying an electric potential from a pulsed power supply 44 through the cell with the resulting field in a direction transverse to the optical axis 28. In the preferred embodiment the transmissive windows 38 and the back surface 46, 48 of the second and third reflectors respectively have anti-reflective coatings. It is to be recognized that the surfaces of these components could be disposed to the optical axis at the Brewster angle to eliminate the requirement of an anti-reflective coating. The end windows 50 of the gain tube are shown positioned at the Brewster angle to the optical axis. The transmission windows 38 and the cell walls 40 cooperate to contain a switching gas capable of exhibiting a Stark effect. In the preferred embodiment a mixture of $NH_3$ and $ND_3$ is inserted into the switching cell resulting in the formation of $NH_2D + ND_2H + NH_3 + ND_3$. The $NH_2D$ gas is capable of having a large Stark effect, while the $NH_3$, $ND_3$ and $ND_2H$ components have little effect on the Stark switching.

The gain tube 26, typically containing a carbon dioxide gain media, is sized to have dimensions compatible with the dimensions of the switching cell and its geometry is chosen to minimize intracavity mode matching elements while maximizing the use of the carbon dioxide discharge volume needed to obtain the desired average power output. The gain tube may be constructed according to conventional large bore configurations or may be constructed as a wave guide laser having a bore diameter typically one to three millimeters. In the preferred embodiment the first reflector has a grating surface blazed for operation near ten micrometers wavelength. The angular position of the grating and the separation between the grating and the second reflector are selected to obtain an oscillation line of the laser radiation compatible with the Stark active absorption lines of the gas within the switching cell. For $NH_2D$ gas, the grating angle and the separation between the grating and the second reflector are adjusted to obtain maximum power output on the P20 line of the carbon dioxide molecule.

As discussed hereinafter the second reflector, the third reflector and the switching cell cooperate to form an output mirror 52 of the laser. The reflectivity of the output mirror is a function of the voltage applied across the gas in the switching cell, the reflectivity of the coating on the second and third reflectors and the separation between the second and third reflectors. In the preferred embodiment the second and third reflectors have reflective coatings with an eighty-five percent reflectivity.

To achieve low voltage operation with the switching cell, the cross-sectional dimensions of the cell should be small, preferably limited to several millimeters. The combination of the gain tube and switching cell should be mode matched either by a single short focal length lens inserted between the elements (not shown) or by a simple close-coupling of the switching cell and the laser gain tube. Although the operational characteristics of the laser gain tube are not critical to the operation of the present invention, the preferred embodiment includes a three millimeter bore diameter wave guide laser gain tube with total gas pressures variable over the range from ten to over sixty torr. Typical partial pressures for an intermediate pressure of thirty-two torr would be the ratio of helium to nitrogen to carbon dioxide equal to 13:17:2 torr. At these intermediate pressures the typical plasma tube voltage was about five kilovolts with operating currents ranging from five to twenty milliamps producing a typical output power of about twelve watts at an efficiency of about fifteen percent.

The second reflector 22, and the third reflector 32 defining the second cavity 30 form a Fabry-Perot etalon which cooperates with the switching cell disposed therein to provide the output mirror 52 of the laser 10. The etalon has a separation between the second and third reflectors capable of being adjusted, as discussed hereinafter, by a piezoelectric transducer 54 attached to the back surface 48 of the third reflector. In the preferred embodiment the piezoelectric transducer is a hollow cylinder symmetrically disposed about the optical axis 28 and capable of allowing the laser beam to pass therethrough. The parallel plate electrodes 42 located within the cell 36 are connected to a high voltage pulse generator capable of delivering rectangular pulses having submicrosecond widths. In the preferred embodiment the second and third reflectors are made of zinc selenide and have an eighty-five percent reflective coating applied thereto. The transmission windows 38 of the switching cell are also formed with zinc selenide windows and have anti-reflective coatings.

Figure 2:
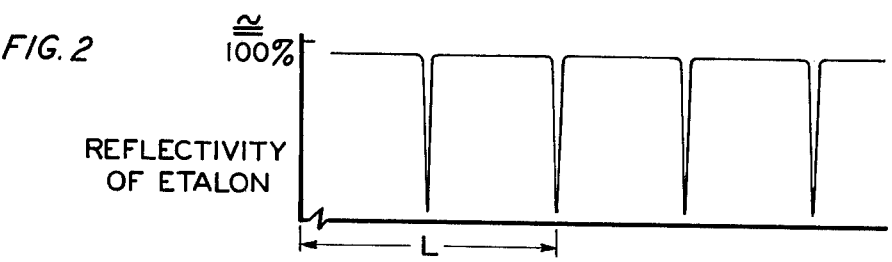
FIG. 2 shows the variation of reflectivity of a Fabry-Perot etalon as a function of reflector separation.
Figure 3:
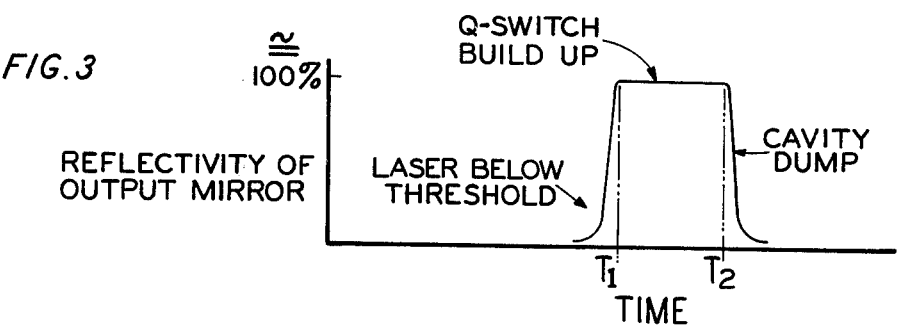
FIG. 3 shows the variation of reflectivity of the etalon as a function of voltage applied to the switching cell.

The active switching of a continuous wave carbon dioxide gain medium evolves as follows. The piezoelectric transducer 54 on the third reflector 32 adjusts the separation L between the second and third reflectors such that the reflectivity of the etalon, at the frequency of the radiation capable of oscillating within the first cavity, represents a near total transmitter as shown in FIG. 2. This results in the gain of the first cavity 12 being far below the threshold for laser operation and no laser radiation is emitted. Also in repetitively pulsed operation this results in the absence of continuous wave lasing in the intrapulse period. A voltage pulse applied between the plate electrodes 42 produces a Stark effect in the $NH_2D$ gas resulting in an optical phase and an optical index change within the gas which rapidly changes the transmitting Fabry-Perot etalon to a highly reflective state at time $T_1$ as shown in FIG. 3. At this point an intracavity Q-switch buildup of radiation within the first cavity results since the main intracavity loss elements are the losses at the grating and losses at the etalon, both of which are small. Since both of these are highly reflective at the lasing frequency, the Q-switch buildup proceeds rapidly. When the intracavity flux due to the transient optical Q-switch reaches a maximum, the voltage to the switching cell is terminated as shown at $T_2$ in FIG. 3 thereby rapidly returning the etalon to its transmitting state. The Q-switched pulse built up within the first cavity is then essentially dumped out of the cavity through the etalon as a pulse having a submicrosecond duration.

Since the high reflectivity state of the etalon is used for the Q-switched buildup while the low reflectivity state of the etalon accomplishes the cavity dump, saturation effects in the switching gas, which would normally influence the pulse length, are minimized since the high effective reflectivity of the etalon minimizes the optical power circulating within the switching gas during the Q-switch buildup. Also since the etalon is initially positioned with the separation between reflectors adjusted to yield a state having high transmission, no direct current voltage bias is needed on the switching cell to provide intracavity Q-spoiling in the interpulse period. As a result voltage breakdown difficulties in the low pressure $NH_3/ND_3$ gas mixture are minimized.

Figure 4:
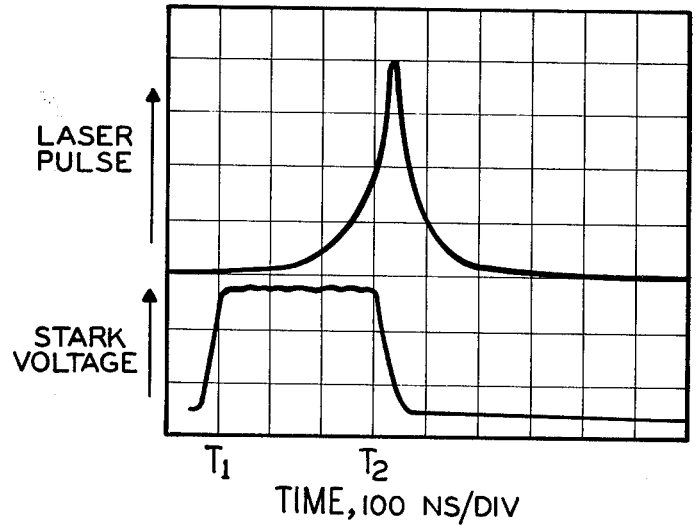
FIG. 4 shows a typical Q-switched, cavity dumped pulse obtained in accordance with the present invention.

In the operation of the present invention an approximately 1.2 kilovolt voltage pulse typically having a duration of three hundred nanoseconds is applied to the switching cell by the power supply 44. The effective reflectivity of the etalon is changed from its initial low reflectivity state to a very high reflectivity state. As shown in FIG. 4, at a time $T_2$ equal to approximately three hundred nanoseconds after initiation of the pulse at time $T_1$, the modulating voltage is terminated and a fast rise in the extracted laser pulse energy is obtained followed by an approximately one hundred nanosecond long trailing edge. The overall cavity dumped pulse width achievable with $NH_2D$ gas having a total pressure of about several torr within the switching cell is approximately seventy nanoseconds at the full width half maximum point. The maximum pulse energy produced under these conditions was in excess of ten microjoules thereby yielding peak powers on the order of two hundred watts.

The present invention is capable of providing optical pulses having pulse widths capable of being varied from approximately fifty nanoseconds to three hundred nanoseconds. During operation, the gain of the laser is below threshold until a voltage pulse is applied to the gas within the switching cell to alter the Fabry-Perot resonance frequency to obtain a high reflectivity condition. If the magnitude of the voltage pulse is such that the high reflectivity state is somewhat below one hundred percent, the resulting Q-switched buildup of optical flux will be outcoupled from the laser as it evolves within the coupled resonator to produce a pulse having a pulse width dependent upon the reflectivity. Thus, a variable pulse width can be obtained by controlling the voltage to obtain a reflectivity of the output mirror corresponding to a desired pulse width. Additionally the pulse shapes may be varied by changing the fall time of the voltage pulse applied to the switching cell. A longer fall time results in a reflectivity change producing a cavity dumped pulse having a longer pulse width.

The present invention is adapted for operation with a pulsed power supply capable of providing voltage pulses up to at least twenty-five thousand pulses per second. This results in the generation of optical pulses each having a submicrosecond pulse width at pulse repetition frequencies of up to at least twenty-five kilohertz.

One limiting feature of cavity dumping by Stark switching is gas breakdown which can occur within the low pressure switching cell. This problem can be moderated by the addition of an electro-negative gas additive to inhibit gas breakdown. Although numerous fluorinated or chlorinated components possess the required electro-negativity, they typically are highly lossy in the nine and ten micrometers band of carbon dioxide lasers. For the P20, 10.59 micrometers radiation, $CF_4$ was found to be an effective electro-negative breakdown inhibiting gas.

While this invention has been particularly shown and described with reference to preferred embodiments, it will be understood by those skilled in the art that the foregoing and other changes in the form and detail may be made therein without departing from the spirit and scope of the invention.

Having thus described a typical embodiment of our invention that which we claim as new and desire to secure by Letters Patent of the United States is:

1. A laser having an optical axis and adapted for providing submicrosecond pulses of infrared radiation comprises:
    a first cavity including a gaseous gain medium capable of continuous wave operation defined at one end by a first reflector and at the other end by a second reflector;
    a second cavity defined at one end by the second reflector and at the other end by a third reflector wherein the first cavity and the second cavity are symmetrically disposed about the optical axis in optical line of sight communication with each other and wherein the second reflector and the third reflector define a Fabry-Perot etalon, which functions as the output mirror of the laser;
    a switching cell symmetrically disposed about the optical axis within the second cavity;
    means for applying an electric potential across the switching cell with the resulting electric field in a direction transverse to the optical axis;
    means for tuning the first cavity to obtain maximum optical flux of a specific wavelength of radiation oscillating within the first cavity; and
    means for varying the separation between the second reflector and the third reflector to tune the second cavity to the wavelength of radiation capable of oscillating within the first cavity.

2. The invention in accordance with claim 1 further including a gaseous gain medium within the first cavity having at least some carbon dioxide gas.

3. The invention in accordance with claim 1 wherein the switching cell contains a gas capable of exhibiting a Stark effect.

4. The invention in accordance with claim 3 wherein the gas capable of exhibiting a Stark effect includes at least some $NH_2D$.

5. The invention in accordance with claim 1 wherein the means for tuning the first cavity is a piezoelectric transducer positioned on the first reflector and adapted for controlling the separation between the first reflector and the second reflector.

6. The invention in accordance with claim 1 wherein the first reflector is a grating.

7. The invention in accordance with claim 6 wherein the grating has a surface blazed for operation near ten micrometers wavelength.

8. The invention in accordance with claim 1 wherein the means for varying the separation between the second reflector and the third reflector is a piezoelectric transducer attached to the third reflector and having a hollow cylindrical configuration adapted for passing a laser pulse therethrough.

9. The invention in accordance with claim 1 wherein the means for applying an electric potential across the switching cell with the resulting electric field in a direction transverse to the optical axis is a pair of electrodes disposed within the switching cell juxtaposed opposite walls of the switching cell.

10. The invention in accordance with claim 9 further including a voltage source adapted for applying substantially rectangular wave voltage pulses, having submicrosecond duration, to the electrodes.

11. The invention in accordance with claim 10 wherein the voltage source is adapted for providing the submicrosecond pulses at a pulse repetition frequency of up to at least twenty-five kilohertz.

12. A method of Q-switching and cavity dumping a continuous wave laser to provide laser pulses having submicrosecond pulse widths comprising:
    providing a laser having a first cavity including a gaseous gain medium adapted for continuous wave operation and a second cavity defined at one end by a second reflector and at the other end by a third reflector wherein the second and third reflectors form a Fabry-Perot etalon;
    providing a switching cell within the second cavity for maintaining a gas capable of exhibiting a Stark effect within the switching cell such that the gas and the reflectors defining the etalon cooperate to provide an output mirror having an effective reflectivity capable of being changed quickly for Q-switching and cavity dumping optical flux within the laser to provide pulses of laser radiation;
    generating a continuous discharge within the gain medium to provide radiation oscillating within the first cavity;
    controlling the wavelength of radiation oscillating within the first cavity with a first reflector defining one end of the first cavity to obtain resonance with the gas within the switching cell;
    controlling the separation between the second and third reflectors to obtain a low reflectivity of the output mirror when the gas within the switching cell is unactivated to allow transmission therethrough of the radiation within the first cavity;
    activating the gas within the switching cell by applying a voltage across the switching cell with the resulting electric field in a direction transverse to the optical axis of the laser to produce a Stark effect within the gas to provide an output mirror having a high reflectivity capable of Q-switching the first cavity;

maintaining the voltage across the switching cell until a desired optical flux within the first cavity is obtained; and terminating the voltage to cavity dump the optical flux within the first cavity to provide a pulse of laser radiation having a submicrosecond pulse width.

13. The invention in accordance with claim 12 wherein the voltage across the switching cell is provided as a substantially rectangular wave voltage pulse having a submicrosecond duration.

14. The invention in accordance with claim 13 further including:

providing submicrosecond pulses at a pulse repetition frequency of up to at least twenty-five kilohertz to obtain submicrosecond laser pulses at a pulse repetition frequency of up to twenty-five thousand pulses per second.

15. The invention in accordance with claim 12 further including:

maintaining the gaseous gain medium with a mixture of gases containing at least some carbon dioxide.

16. The method in accordance with claim 15 wherein the gas maintained within the switching cell includes at least some $NH_2D$.

17. The method in accordance with claim 16 wherein the gas maintained within the switching cell further includes at least some $CF_4$.

18. The invention in accordance with claim 12 wherein the first reflector has a grating surface and the wavelength of radiation oscillating within the first cavity is controlled by angularly adjusting the grating surface with respect to the optical axis to provide enhanced gain for a particular oscillating line of the gain medium.

19. The invention in accordance with claim 18 wherein the grating surface is blazed for operation near ten micrometers wavelength.

20. The invention in accordance with claim 12 further including:

controlling the separation between the first reflector and the second reflector to obtain maximum optical flux within the first cavity.

21. The invention in accordance with claim 20 wherein the separation between the first and second reflectors is controlled with a piezoelectric transducer attached to the first reflector.

22. The invention in accordance with claim 13 wherein the voltage applied across the switching cell has a pulse width of less than six hundred microseconds.

23. The invention in accordance with claim 22 wherein the pulse of laser radiation has a pulse width greater than fifty nanoseconds.

24. The invention in accordance with claim 22 wherein the pulse of laser radiation has a pulse width of less than three hundred fifty nanoseconds.

25. The invention in accordance with claim 13 further including:

controlling the voltage level of the voltage pulse to provide a cavity dumped, Q-switched laser pulse having a variable pulse width.

26. The invention in accordance with claim 13 further including:

controlling the duration of the voltage pulse to provide a cavity dumped, Q-switched laser pulse having a variable pulse width.

27. The invention is accordance with claim 13 further including:

controlling the shape of the voltage pulse to provide a cavity dumped, Q-switched laser pulse having a variable pulse width.

* * * * *